United States Patent [19]

Takahashi et al.

[11] Patent Number: 4,702,554
[45] Date of Patent: Oct. 27, 1987

[54] COATED OPTICAL FIBER

[75] Inventors: Hiroshi Takahashi; Tetsuji Kakizaki; Mitsuyoshi Kato; Koji Nishida, all of Mie, Japan

[73] Assignee: Mitsubishi Petrochemical Co., Ltd., Tokyo, Japan

[21] Appl. No.: 643,731

[22] Filed: Aug. 24, 1984

[30] Foreign Application Priority Data

Sep. 2, 1983 [JP] Japan ................... 58-161641

[51] Int. Cl.$^4$ .......................... B32B 9/00; G02B 6/10; G02B 6/00
[52] U.S. Cl. .................. 350/96.30; 350/96.34; 428/375; 428/391; 428/392
[58] Field of Search .............. 350/96.23, 96.3, 96.34; 428/375, 392; 526/283, 259, 309, 297, 282

[56] References Cited

U.S. PATENT DOCUMENTS

| 3,496,129 | 2/1970 | Wismer et al. | 526/283 X |
| 4,167,305 | 9/1979 | Ichiba et al. | 428/392 X |
| 4,380,617 | 4/1983 | Minchak | 526/283 X |
| 4,412,044 | 10/1983 | Takahashi et al. | 526/283 X |
| 4,503,194 | 3/1985 | Takahashi et al. | 526/283 X |

FOREIGN PATENT DOCUMENTS 51-88600  8/1976  Japan ...................... 526/283

Primary Examiner—Lorraine T. Kendell
Attorney, Agent, or Firm—Oblon, Fisher, Spivak, McClelland, & Maier

[57] ABSTRACT

A coated optical fiber comprising an optical fiber for transmitting information having coated thereon a ring-opened (co)polymer of a norbornene derivative having a polar group. Due to the excellent moldability of the polymer, the coated optical fiber can be produced with high productivity. Even when the coated optical fiber is produced at high speeds, the molding strain on the coating is small, and the coated optical fiber has a reduced heat shrinkage.

2 Claims, 5 Drawing Figures

COATED OPTICAL FIBER

FIELD OF THE INVENTION

This invention relates to a coated optical fiber with an amorphous resin having a high modulus of elasticity, excellent resistance to fracture upon impact and a reduced molding strain.

Commercialization of optical fibers as a high-performance transmission system is now being extensively studied. Since optical fibers are glass fibers composed mainly of silica, the optical fibers have a low elongation and are weak to impact and torsion and susceptible to considerable fracture by an external force which may be exerted thereon during production or installation or in an environment in which the optical fibers are used. Hence, the optical fibers must be protected by coating.

BACKGROUND OF THE INVENTION

Coated optical fibers have various structures which are roughly classified, for example, into (1) a three-layer structure, (2) a loose structure, (3) an FRP structure, and (4) a tape structure.

The coated optical fiber of the three-layer structure is obtained by coating a varnish such as a silicone varnish, on an optical fiber having a diameter of 100 to 150 microns, forming a cushion layer of a silicon rubber having a thickness of 100 to 150 microns thereon as a primary coating, and further providing a secondary coating of a thermoplastic resin such as nylon-12, and has an outside diameter of about 1 mm.

However, since nylon-12 attains a temperature of 200° C. or higher during molding, the optical fiber may be deteriorated. Furthermore, because the resin is crystalline, it shrinks greatly during or after cooling and solidification and strains occur as microbending in the optical fiber to degrade its transmission characteristics.

The FRP coated optical fiber is obtained by using glass fibers as a coating on an optical fiber and solidifying the glass fibers by a thermosetting resin. Since the FRP coated optical fiber can be formed at low temperatures, there is no likelihood of deteriorating the optical fiber during the coating step. It is difficult, however, to procure a resin having both excellent rigidity and excellent strength against fracture by bending, and moreover, the FRP coated optical fiber has a low strength against an external impact.

The coated optical fiber of the tape structure is obtained by holding an optical fiber coated with a curable resin between coating films, and then bonding them by heating or by using an adhesive. When the bonding is effected by heating, the shrinkage of the resin becomes a problem. When an adhesive is used, a drying step is required, and this reduces the productivity.

Resins which can be used for coating optical fibers must have a high modulus of elasticity, excellent impact strength, resistance to cracking against bending stress, a low shrinkage after melt-shaping, moldability at low temperatures, a reduced molding strain even upon high-speed extrusion and good heat aging resistance. No resin meeting all of these requirements is presently available, and nylon-12 is employed although it gives rise to some problem in regard to strains during molding or moldability at low temperatures.

As a result of extensive investigations in order to provide a resin which meets these requirements, it has been found that a ring-opened polymer or ring-opened copolymer of a norbornene derivative having a polar substituent is suitable for coating optical fibers which require thermoplasticity due to a high modulus of elasticity, excellent impact strength, substantially low molding strains (since it is an amorphous resin), and low-temperature moldability.

SUMMARY OF THE INVENTION

An object of this invention is to provide a coated optical fiber comprising a glass fiber having coated thereon a ring-opened polymer or copolymer of a norbornene derivative having a polar substituent.

By coating such a specified resin, there can be obtained a coated optical fiber which is prevented from fracture by an external force which may be exerted thereon during production or installation and in an environment in which it is used. Furthermore, since molding strains are small even when it is produced at high speeds at low temperatures, the light transmitting characteristics of the optical fiber are not reduced.

DETAILED DESCRIPTION OF THE INVENTION

Figure 1:
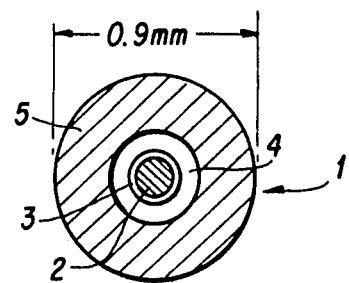
FIG. 1 is a cross-sectional view of one example of the coated optical fiber of the invention which has a three-layer structure.

The norbornene derivative having a polar substituent which can be used in this invention is norbornene derivatives having an ester group, a carboxyl group, a nitrile group, an amide group, an imide group, a halogen atom and an acid anhydride group. Norbornene derivatives represented by the following formula (I)

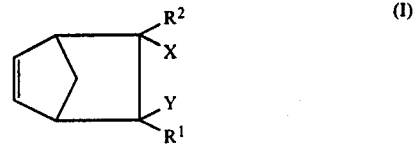

wherein X represents $-(CH_2)_nCOOR^3$, $-(CH_2)_nOCOR^4$, $-(CH_2)_nCOOM$, $-(CH_2)_nCN$, $-(CH_2)_nCONR^5R^6$ or $-(CH_2)_nZ$ (in which n represents an integer of 0 to 17, each of $R^3$, $R^4$, $R^5$ and $R^6$ represents a hydrocarbon group having 1 to 20 carbon atoms, M represents a hydrogen atom, an alkali metal, or an alkaline earth metal, and Z represents a halogen atom); each of $R^1$, $R^2$ and Y represents a hydrogen atom or a hydrocarbon group having 1 to 20 carbon atoms; provided that X and Y, taken together, may represent an imide residue or an acid anhydride residue represented by

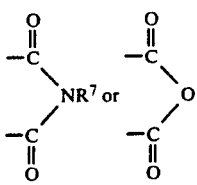

(in which $R^7$ represents a hydrocarbon group having 1 to 20 carbon atoms), are generally used.

The norbornene derivatives having these polar substituents can be ring-open (co)polymerized using the metathesis catalyst described, for example, in Japanese Patent Application (OPI) No. 77999/74 (the term "OPI" as used herein refers to a "published unexamined Japanese patent application").

The norbornene derivatives may be copolymerized with monomers copolymerizable therewith. Preferred copolymerizable monomers include cycloolefins such as cyclopentene, cyclooctene, 1,5,9-cyclododecatriene, 1,5-cyclooctadiene, dicyclopentadiene and norbornene.

Preferred norbornenes are those represented by the following formula

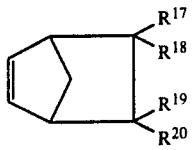

wherein each of $R^{17}$, $R^{18}$, $R^{19}$ and $R^{20}$ represents a hydrogen atom or a hydrocarbon residue having 1 to 20 carbon atoms, provided that $R^{18}$ and $R^{19}$, taken together, may form a saturated or unsaturated cyclic hydrocarbon.

The mole ratio of the norbornene derivative to the cycloolefin to be copolymerized is from 100:0 to 40:60, preferably from 100:0 to 50:50. If the proportion of the cycloolefin exceeds 60%, the resulting polymer has a reduced modulus of elasticity and becomes unsuitable as a coating for optical fibers.

Preferred ring-opened (co)polymers are the norbornene derivatives having a ester group or a carboxylic acid and its ester group. Examples of the (co)polymers of the norbornene derivatives having ester groups or carboxylic acid and their ester groups are polymers consisting essentially of a structural unit (A) represented by the following formula (II)

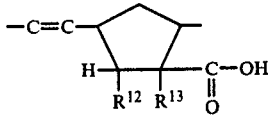

and a structural unit (B) represented by the following formula (III)

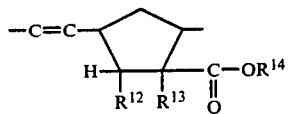

wherein $R^{12}$ represents a hydrogen atom, an alkyl group or a phenyl group, $R^{13}$ represents a hydrogen atom or an alkyl group, and $R^{14}$ represents an alkyl group.

The content of the structural unit (A), in terms of the mole ratio of (A)/(A)+(B), is from 0 to 0.85, preferably from 0.005 to 0.70.

A ring-opened copolymer comprising a mixture of the structural unit (A) of the formula (II) and/or the structural unit (B) of the formula (III), and a unit (D) of a norbornene derivative having a nitrile group can be used.

The structural unit (D) of the norbornene derivative having a nitrile group is represented by the following formula (IV)

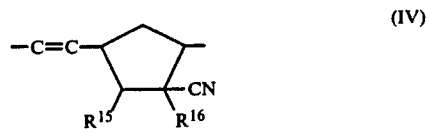

wherein $R^{15}$ represents a hydrogen atom, an alkyl group having 1 to 20 carbon atoms, or a phenyl group, and $R^{16}$ represents a hydrogen atom or an alkyl group.

The mole ratio of (D)/(A)+(B)+(D) is in the range of 0.05 to 0.90 and preferably the mole ratio of (A)/(A)+(B) is from 0 to 0.8.

A copolymer comprising the structural unit (A) of formula (II) and/or the structural unit (B) of formula (III), and a norbornene unit (E) of formula (V) described below or ring-opened cycloolefine unit (F) of formula (VI) described below can also be used.

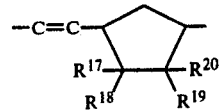

wherein each of $R^{17}$, $R^{18}$ $R^{19}$ and $R^{20}$ represents a hydrogen atom or a hydrocarbon group having 1 to 20 carbon atoms.

wherein each of $R^{21}$, $R^{22}$, $R^{23}$ and $R^{24}$ represents a hydrogen atom or a hydrocarbon residue having 1 to 10 carbon atoms, preferably 1 to 3 carbon atoms, and n represents an integer of 2, 3, or 5 to 10.

The mole ratio of (E) and (or) (F)/(A)+(B)+(E)+(F) is from 0.01 to 0.6, preferably from 0.05 to 0.4 and preferably the mole ratio of (A)/(A)+(B) is from 0 to 0.85.

When the ring-opened (co)polymer of the norbornene derivative is used as a secondary coating of a coated optical fiber, it preferably has high rigidity. Desirably, it has a trans-form double bond content of at least 40%, preferably at least 45%.

A stabilizer, a plasticizer, or an inorganic or organic filler may be added to the ring-opened (co)polymer.

In the case where a coated optical fiber is produced using the above-described ring-opened copolymer, the coated optical fiber having a three-layer structure is formed.

As shown in FIG. 1, a coated optical fiber 1 of the three-layer structure is formed by first forming an anchor coat layer 3 such as a silicone varnish on the surface of an optical fiber 2 as required, pre-coating an elastomer such as a silicone rubber on the outside to form a primary coating 4 and further coating the ring-opened (co)polymer of the invention on the outside of the layer 4 to form a secondary coating 5.

Figure 2:
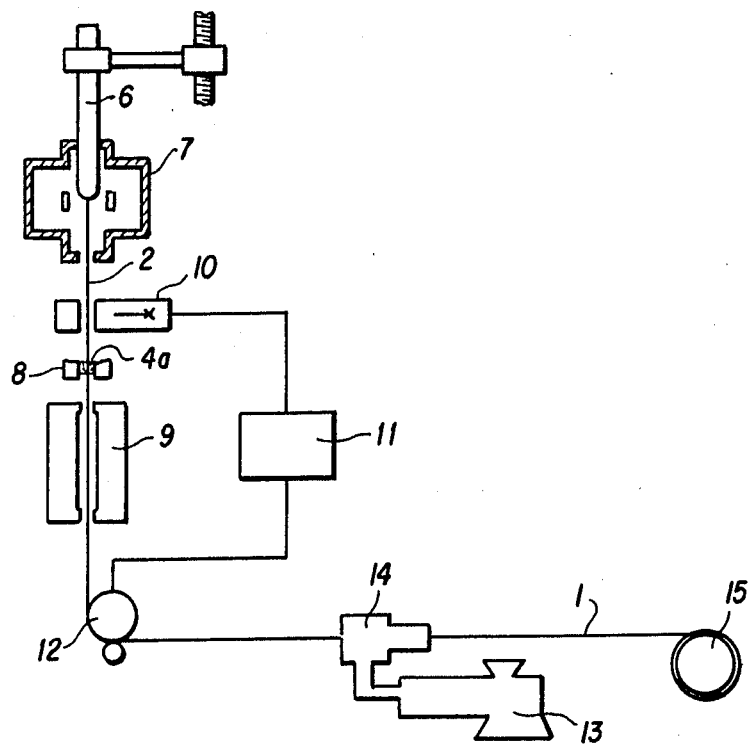
FIG. 2 is a simplified view of the process for producing the coated optical fiber shown in FIG. 1.

The coated optical fiber 1 of the three-layer structure can be produced by the method shown in FIG. 2.

A preform 6 as a matrix of of the optical fiber 2 is melted in a heating furnace 7 and then drawn into a fine filamentary optical fiber 2. The optical fiber 2 is passed through a precoating vessel 8 holding a precoating material 4a and a heating furnace 9 and precoated to form a primary coating 4.

The precoating can be effected by applying an elastomer such as a silicone rubber to the surface of the glass fiber after, as required, an anchor coat 3 such as a silicone varnish is applied to it by a coater (not shown).

The reference numeral 10 represents a fiber diameter measuring device, and 11, a fiber diameter control circuit. By adjusting the rotating speed of a capstan 12, the fiber diameter is adjusted to a constant value.

The pre-coated optical fiber 2 is fed to a crosshead 14 of an extruder for melt-extruding the ring-opened (co)polymer of the invention. The polymer is thus coated to form a coated optical fiber 1 which is wound up by a winder 15.

Figure 3:
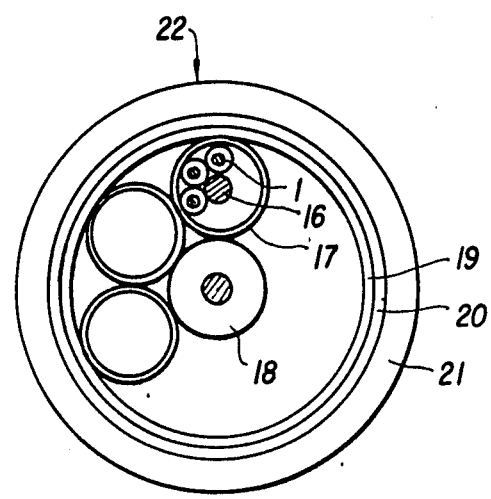
FIG. 3 is a cross-sectional view of an optical fiber cable comprising a plurality of the three-layer coated optical fibers shown in FIG. 1.

Several coated optical fibers of the three-layer structure so produced are bundled with a tension member 16 placed at the center as shown in FIG. 3. The periphery of the bundle is wrapped with a cushioning material 17 such as a plastic cushioning material. Several such bundles are bundled with a second tension member 18 placed at the center, and the bundle is covered with a plastic tape 19, an aluminum laminate tape 20, a polyethylene resin 21, etc. to form an optical fiber cable 22 which is used for light transmission systems.

Figure 4:
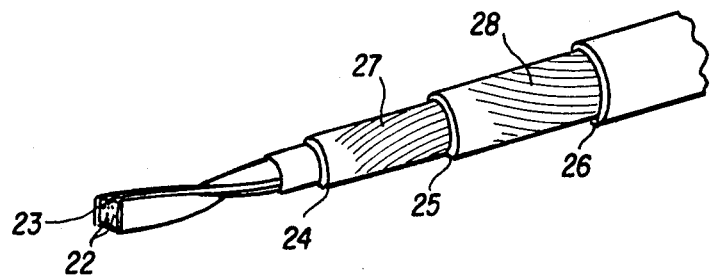
FIG. 4 is a schematic view of another example of the coated optical fiber of the invention which has a tape structure.

The coated optical fiber 1 of the invention may also have the tape structure shown in FIG. 4.

The coated optical fiber of the tape structure has the structure shown in FIG. 4 in which a first sheath 24, a second sheath 25 and a third sheath 26 are applied through fibrous or tape-like reinforcing materials 27 and 28 to the outside of a ribbon-like tape 23 formed by heat-bonding a plurality of glass fibers 2. The ring-opened (co)polymer of the invention is used in the ribbon-like tape 23, the first sheath 24, the second sheath 25 and the third sheath 26.

Figure 5:
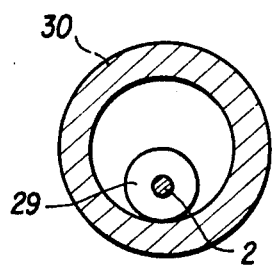
FIG. 5 is a cross-sectional view of still another example of the coated optical fiber of the invention which has a loose structure.

The coated optical fiber of the invention may also have a loose structure as shown in FIG. 5. A coating 29 is formed on the outside of an optical fiber 2 and the resulting coated fiber is inserted in an outer cylinder 30. The ring-opened (co)polymer can be used as a material for the coating 29 and the outer cylinder 30.

When the ring-opened (co)polymer is coated by melt-molding, its suitable intrinsic viscosity is 0.2 to 4.0, preferably 0.2 to 2.0, more preferably 0.25 to 1.0. If the intrinsic viscosity is less than 0.2, the polymer does not have sufficient resistance to fracture by impact. If the intrinsic viscosity exceeds 4.0, the polymer cannot be molded at low temperatures, and strains become great during molding.

An alternative method of producing a coated optical fiber comprises dissolving the ring-opened (co)polymer in a solvent such as acetone or tetrahydrofuran, dipping an optical fiber in the solution to coat its surface, and then drying the coated optical fiber.

The ring-opened (co)polymer of the norbornene derivative can be used in combination with another monomer because the (co)polymer has excellent impact strength and contains a double bond and a polar functional group.

According to this method, the ring-opened (co)polymer of the norbornene derivative is mixed with a polymerizable monomer such as styrene, methyl (meth)acrylate, ethyl (meth)acrylate, butyl (meth)acrylate, an epoxy resin or an oligoamide; a crosslinking agent such as a difunctional or higher mercaptan; a resin precursor; a radical initiator such as azobisisobutyronitrile; a light sensitizer such as acetophenone or benzophenone; and as required a solvent (for example, an aromatic solvent such as benzene, toluene or xylene; a ketone such as acetone or methyl ethyl ketone; or tetrahydrofuran) to form a solution of the ring-opened (co)polymer, coating the solution on an optical fiber, and curing the coating by light or heat.

The ring-opened (co)polymer used in this method has an intrinsic viscosity of 0.1 to 2.0, preferably 0.1 to 1.0. The concentration of the ring-opened (co)polymer in the solution is 2 to 90% by weight, preferably 5 to 60% by weight.

A coated optical fiber having improved tensile strength can be produced by providing reinforcing glass fibers along an optical fiber, coating the fiber assembly with the aforesaid polymer solution, and solidifying the coating.

Since the ring-opened (co)polymer of the norbornene derivative shrinks little during molding, light losses due to the occurrence of strain can be prevented. Furthermore, since it has high rigidity and high impact strength, it is possible to prevent an accident of fracture of the optical fiber which may be caused by the cracking of the coating, resulting in stress concentration.

The coated optical fiber of this invention may further be coated with another resin such as nylon-12. When the ring-opened (co)polymer is used as an internal coating it preferably has a high tensile elongation. Desirably, the ring-opened (co)polymer has a trans-form double bond content of not more than 90%, preferably not more than 80%.

The following Examples illustrative the present invention more specifically.

EXAMPLE 1

The basic properties of a polymer of methyl 5-norbornene-2-carboxylate (intrinsic viscosity 0.35, measured at 30° C. in tetrahydrofuran) are shown in Table 1. This resin showed a three-point flexural modulus of elasticity of 21,500 kg/cm$^2$ which is nearly twice as high as that of nylon-12. Furthermore, the polymer was amorphous and had a small strain during molding. This was due to the fact that the resin had resistance to the occurrence of microbending.

The resin was extrusion-coated by an extruder (50 mm) at 150° C. at a line speed of 30 m/min. on an optical fiber having a diameter of 125 microns, and the coated optical fiber was wound up on a rotating drum. The optical fiber as a core was removed, and the secondary coating composed of the above resin was examined for molding strain and heat aging resistance. The results are shown in Table 2. It was seen that the resin did not undergo molding shrinkage, and had good heat aging resistance.

EXAMPLE 2

A coated optical fiber was produced by the same manner as in Example 1 except that the ring-opened polymer used in Example 1 was hydrolyzed to an extent of 30 mole% to form a copolymer of methyl 5-norbornene-2-carboxylate and 5-norbornene-2-carboxylic acid. The resin extruding temperature was changed to 190° C.

The data of molding strain and heat aging resistance obtained as same as in Example 1 are shown in Table 2. These properties of the coating were both good.

EXAMPLE 3

A coated optical fiber was produced by the same manner as in Example 1 except that instead of the ring-opened polymer used in Example 1, a copolymer of methyl 5-norbornene-2-carboxylate and cyclopentene (cyclopentene content 15 mole%, intrinsic viscosity 0.9) was used, and the extruding temperature was changed to 180° C. The molding strain and aging resistance of the clad layer were measured and the results are shown in Table 2. Both of these properties were found to be good.

EXAMPLE 4

A coated optical fiber was produced by the same manner as in Example 1 except that a ring-opened polymer of 5-norbornene-2-nitrile (intrinsic viscosity 0.65) was used instead of the ring-opened polymer used in Example 1, and the extruding temperature was changed to 180° C. The molding strain and aging resistance of the clad layer were measured, and the results are shown in Table 2. Both of these properties were found to be good.

As stated hereinabove, by using the ring-opened (co)-polymer of a polar norbornene derivative as a coating material, a coated optical fiber could be obtained at temperatures lower than 200° C. Since the coating has a reduced molding strain and a high modulus of elasticity, light transmission losses due to microbending are small.

EXAMPLE 5

100 parts by weight of a polymer of methyl 5-norbornene-2-carboxylate (intrinsic viscosity 0.22, measured at 30° C. in tetrahydrofuran) was put in 250 parts by weight of tetrahydrofuran and heated to form a viscous solution. 20 parts by weight of pentaerythritol tetrakis(-mercaptopropionate) and 1 part by weight of benzophenone were then added to form a solution.

An optical fiber having a primary coating of silicone rubber was passed through the solution to coat it and the coated fiber was then dried.

The coated fiber was passed through a 1 KW high-pressure mercury lamp for 3 seconds to cure the coating by UV irradiation to form a secondary coating. The coated fiber was wound up on a rotating drum. The molding shrinkage was 0%, and the heat-aging resistance was −10%.

While the invention has been described in detail and with reference to specific embodiments thereof, it will be apparent to one skilled in the art that various changes and modifications can be made therein without departing from the spirit and scope thereof.

What is claimed is:

1. A coated optical fiber comprising an optical fiber for transmitting information having coated thereon a layer of a homopolymer or a copolymer containing a ring-opened norbornene derivative having a polar group as a structural unit, wherein said ring-opened norbornene derivative is composed of a structural unit (A) of formula (II)

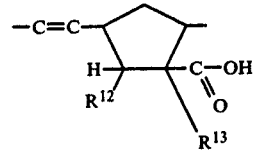

TABLE 1

| Item | Unit | Measuring method | Example 1 | Example 2 | Example 3 | Example 4 | Comp. Example 1 |
|---|---|---|---|---|---|---|---|
| Three-point bending modulus of elasticity | Kg/cm$^2$ | D790 | 21500 | 22500 | 19500 | 20000 | 11000 |
| Tensile strength | Kg/cm$^2$ | D638 | 340 | 390 | 310 | 500 | 450 |
| Tensile elongation | % | D638 | 180 | 150 | 230 | 170 | 100 |
| Izod impact strength | Kg cm/cm(*) | D256 | >420 | >420 | >420 | >420 | 6 |
| Heat distortion temperature (18.6 Kg load) | °C. | D648 | 58 | 77 | 52 | 90 | 50 |
| Coefficient of linear expansion | ×10$^{-5}$ cm/cm/°C. | D696 | 6 | 6 | 8 | 6 | 10 |
| Water absorption | % | D570 | 0.4 | 0.6 | 0.5 | 0.6 | 1.4 |
| Molding shrinkage | % |  | 0.5 | 0.5 | 0.5 | 0.5 | 1.2 |
| Hardness | R-Scale | D785 | 105 | 108 | 103 | 118 | 106 |

(*)Sample thickness 2 mm

TABLE 2

|  | Molding strain (*1) (%) | Heat aging resistance (*2) (%) |
|---|---|---|
| Example 1 | 0 | −6 |
| Example 2 | 0 | −5 |
| Example 3 | 0 | −10 |
| Example 4 | 0 | −6 |
| Comp. Example 1 | −1 | −32 |

(*1): The molding shrinkage was determined as follows: The secondary coating left after removing the core was cut to a length of 50 mm, and maintained at 100° C. for 1 hour. Then, a change in size of the sample was measured by slide calipers.
(*2): The heat aging resistance was determined as follows: The sample described above was treated at 80° C. for 5 days, and the tensile elongation of the sample was compared with that before the treatment and a structural unit (B) of formula (III)

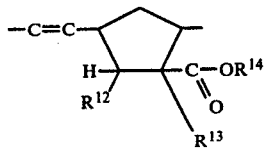

wherein R$^{12}$ represents a hydrogen atom, an alkyl group or a phenyl group, R$^{13}$ represents a hydrogen atom or an alkyl group, and $R^{14}$ represents an alkyl group, the mole ratio of (A)/(A)+(B) being from 0 to 0.85, wherein the intrinsic viscosity of said homopolymer or copolymer is from 0.2 to 2.0.

2. The coated optical fiber as claimed in claim 1, wherein the homopolymer or copolymer containing a ring-opened norbornene derivative is obtained by coating said optical fiber with the polymer of claim 1 and then curing the coating.

* * * * *